UNITED STATES PATENT OFFICE.

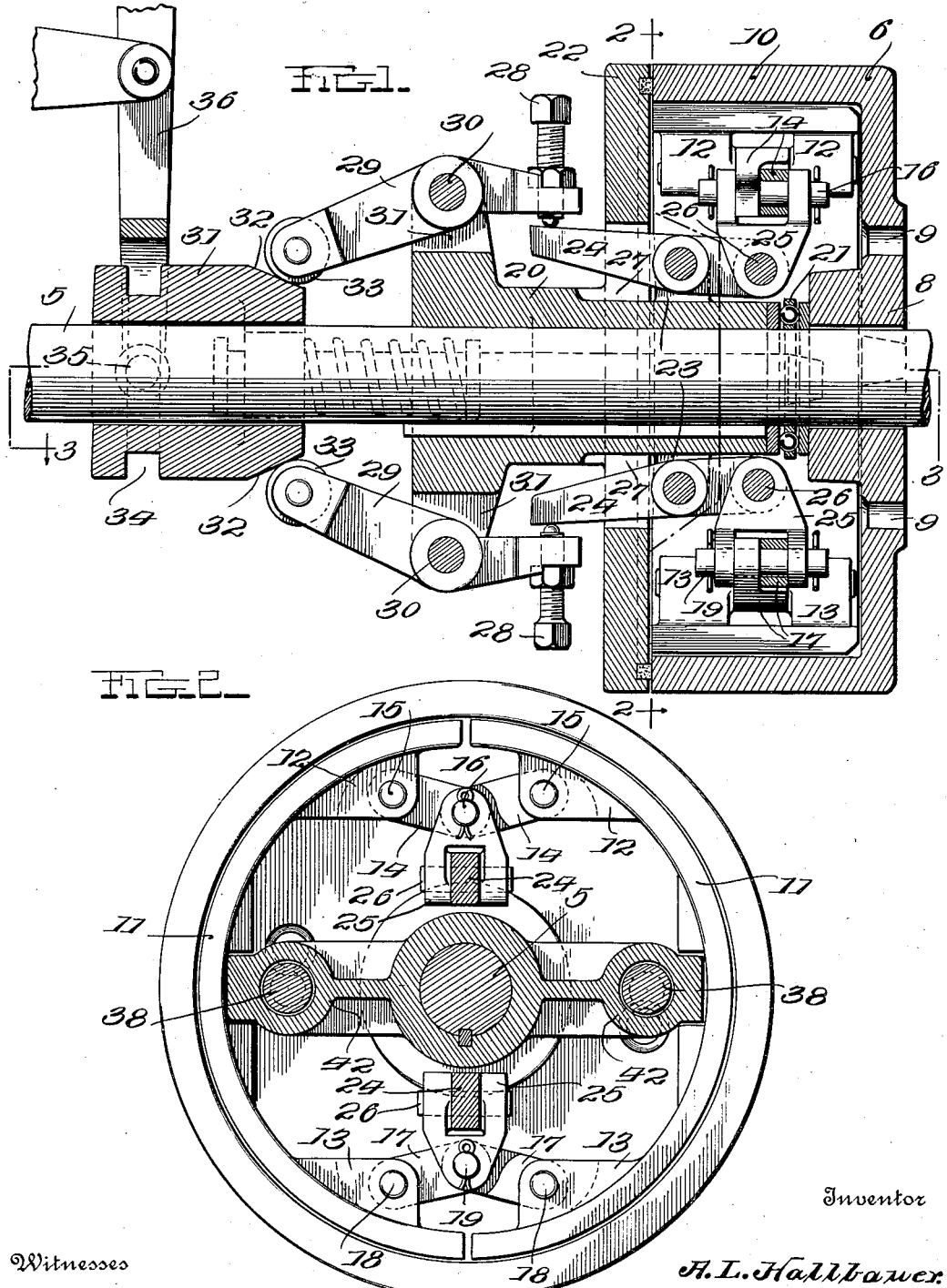

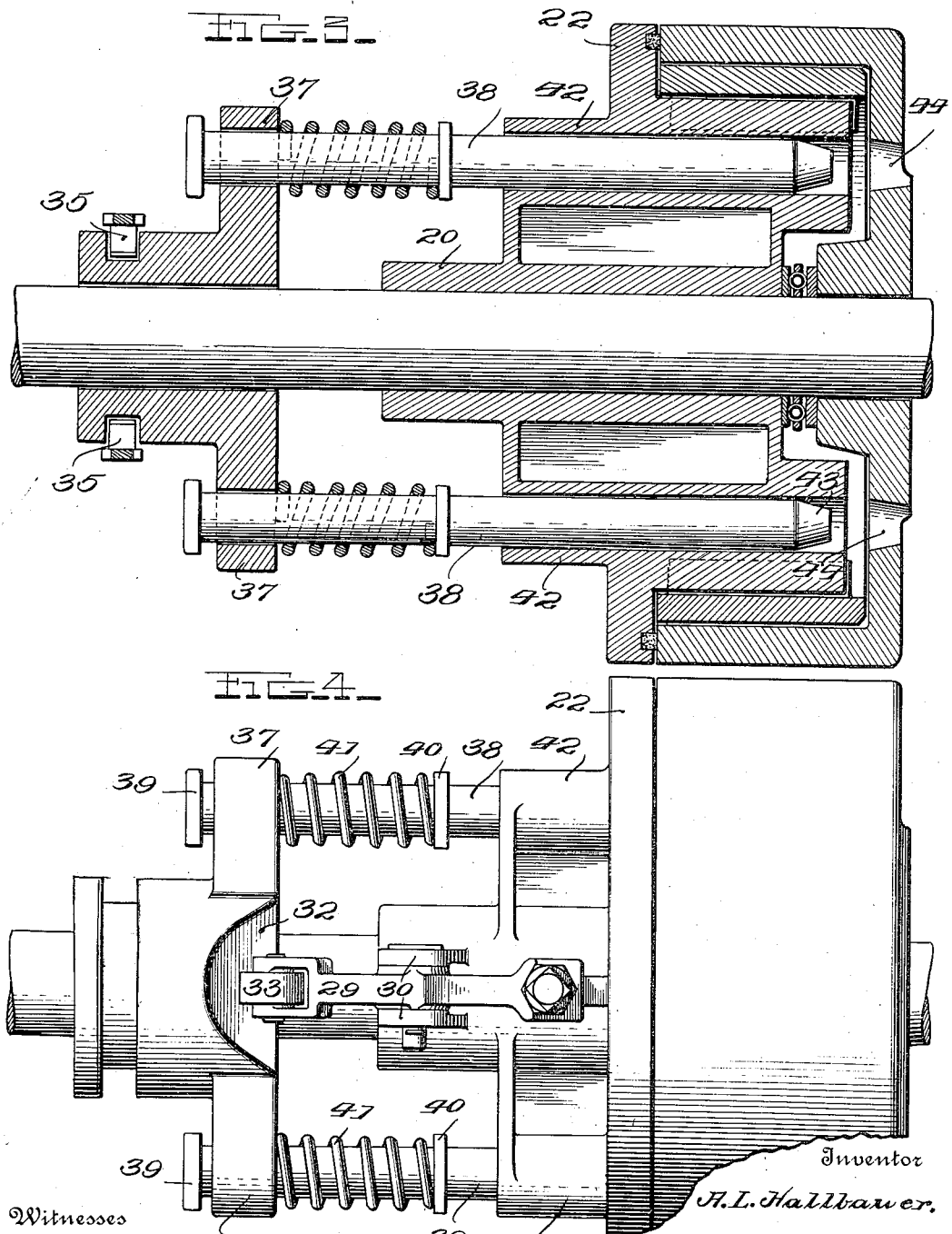

ALBERT L. HALLBAUER, OF TAMPA, FLORIDA, ASSIGNOR TO PALMETTO MACHINE COMPANY, INCORPORATED, OF BALTIMORE, MARYLAND, A CORPORATION OF MARYLAND.

COMBINED FRICTION AND POSITIVE CLUTCH.

1,098,148.      Specification of Letters Patent.      Patented May 26, 1914.

Application filed June 28, 1913. Serial No. 776,377.

*To all whom it may concern:*

Be it known that I, ALBERT L. HALLBAUER, a citizen of the United States, residing at Tampa, in the county of Hillsboro and State of Florida, have invented certain new and useful Improvements in Combined Friction and Positive Clutches, of which the following is a specification.

My invention relates to certain new and useful improvements in clutches, and the object of my invention is to provide a clutch which will first operate as a friction clutch, and then become a positive clutch.

A further object of my invention is to provide a clutch of this character which shall be simple, durable and highly efficient, composed of few parts and not likely to get out of order.

With the foregoing and other objects in view my invention consists in certain constructions, combinations and arrangements of parts, the preferred form of which will be first described in connection with the accompanying drawings, and then the invention particularly pointed out in the appended claim.

Referring to the drawings wherein the same part is designated by the same reference numeral wherever it occurs, Figure 1 is a central longitudinal section of the preferred embodiment of my invention; Fig. 2 is a section taken on line 2, 2 of Fig. 1 and looking in the direction of the arrow; Fig. 3 is a section taken on line 3, 3 of Fig. 2, and Fig. 4 is a top plan view of the construction shown in Fig. 1.

5 designates a shaft and 6 a drum loosely mounted on said shaft, said drum being provided with a face portion 8 to which may be bolted a gear or other part to be driven, by suitable bolts, which may be passed through the bolt openings 9. The drum is provided with the flange portion 10 extending at right angles to the face 8, and the interior of this flange portion forms a friction surface against which may be forced the two halves 11 of a friction ring. Adjacent each end of each half ring 11 are provided ears 12, 13, whereby a pair of ears 12, 12, and a second pair of ears 13, 13 are opposed to each other, on opposite sides of the friction ring. The pairs of ears 12, 12 are connected together by a pair of toggle arms 14, 14, pivoted in the ears by the pivots 15, and pivoted together by the pivot 16.

The pairs of ears 13, 13 are similarly connected together by a pair of toggle arms 17, pivoted in the ears by the pivot pins 18, 18, and pivoted together by the pivot pin 19.

20 designates a sleeve keyed fast on the shaft 5 and extending within the drum. The end of this sleeve is preferably separated from the head 8 of the drum by a ball-bearing 21 of any desired form. The sleeve carries a circular disk 22, adapted to contact with the free edge of the flange 10 to close the drum. Formed on opposite sides of the sleeve are pairs of ears 23, 23, in which are pivoted the levers 24, 24, the inner ends of the levers being connected to the pivot pins 16, 19 of the toggles by the links 25, 25, which are pivoted at one end onto the pins 16 and 19, and at the other end on the pivot 26, 26, carried by the lever 24. The outer end of each lever 24 extends through an opening 27, 27, in the disk 22, and is in position to be engaged by the end of a set screw 28, 28, carried by a lever 29, 29, pivotally mounted on the pivot 30, 30, supported in the ears 31, 31, formed on the rear end of the sleeve. From this construction it will be seen that when the levers 29, 29 are operated to force the ends of the adjusting screws against the levers 24, 24 these last-mentioned levers will operate through the toggles 14, 14 and 17, 17 to expand the ring 11 against the inner surface of the flange 10. In order to operate the levers 29, 29 I have provided a sliding collar 31, feathered on the shaft 5, and having wedge portions 32, 32, adapted to contact with anti-friction wheels 33, 33, carried in the ends of the levers 29. In order to slide the collar 31 I have shown it as provided with a groove 34 into which extends a pair of pins 35, 35, carried by a fork of an operating lever, indicated at 36. The collar 31 is also provided with a pair of oppositely extending arms 50, terminating in squared bosses 51, which engage the cutaway portion 52 formed on the inner side of each half of the split ring. By this construction it will be seen that when the ring is in engagement with the drum that the driving strain will be transmitted through the bosses 51 to the shaft 5, instead of through the toggles 14, as would be the case were these bosses not provided.

In order to provide positive locking means between the two parts of the clutch after the friction ring has been expanded the maximum amount I provide a pair of ears 37, 37, one in each of the arms 50, mounted on opposite sides of the collar 31, and between the inclined portions 32. Extending through openings formed in the ears are a pair of pins 38, 38, each pin being formed with a head 39 adapted to contact with the ear, and on the opposite side with a collar 40, between which and the ear 37, is confined a coil spring 41 surrounding the pin. Beyond the collar 40 each pin extends through a guide 42 formed on the sleeve 20, and extending through the disk 22, as best shown in Fig. 3. The inner end of each pin is preferably tapered as shown at 43. The portion 8 of the drum is provided with conical openings 44 in which, under certain conditions, the conical ends 43 of the pins are adapted to enter.

The position of the clutch shown in the drawings is that in which the sleeve 31 has been moved just sufficient to bring the halves of the friction ring in contact with the flange of the drum, and it is to be noted that the ends of the pins are such a distance away from the inner surface of the face portion 8 of the drum that the ends of the pins will not contact with the inner face until the rollers 33 of the levers 29, 29 have reached the top of the incline or wedge portion 32 of the sleeve. In this position the maximum frictional effect of the friction ring on the drum is given. To completely throw the clutch however the sleeve 31 is moved until the roller 32 has ridden across the flat upper portion thereof, which latter movement will drive the ends of the pins against the inner surface of the face plate 8 and compress the springs 41. Should the clutch now slip the pins and face plate will rotate in relation to each other until the pins come in register with the openings 44, when the force of the coil springs will drive them into the openings and thus positively lock the two parts of the clutch together. When the sleeve 31 is moved in the opposite direction to release the clutch the engagement of the ears 37 with the heads 39 of the pins will withdraw them from engagement with the openings 44, before the toggles forcing the friction ring into engagement with the flange will have been broken.

I am aware that considerable variation is possible in the details of construction herein shown and described, without departing from the spirit of my invention, and I do not intend to limit myself thereto, except as pointed out in the following claim, in which it is my intention to claim all the novelty inherent in the structure shown and described as broadly as the state of the art will permit.

Having thus described my invention what I claim as new and desire to secure by Letters Patent is:

In a clutch mechanism, in combination, a shaft, a driving member and a driven member mounted thereon one coactively fitting within the other, and comprising an expansible split friction ring, toggles between the adjacent ends of the parts of said ring adapted to move to extended position to expand the ring, a series of levers of the first order connected with each toggle, means for adjusting one lever of each series with respect to another, cam means for simultaneously actuating said series of levers, means independent of said toggles and levers adapted to transmit motion from the driving to the driven member, means associated with one of said members and coacting with the other adapted to lock said members in clutched relation after said ring has been completely expanded by said toggle, and an anti-friction device separating the driving and driven members.

In testimony whereof I affix my signature in presence of two witnesses.

ALBERT L. HALLBAUER.

Witnesses:
JOHN BUCKLE,
MARCUS E. SPERRY.